United States Patent [19]

Weinger

[11] Patent Number: 4,642,676

[45] Date of Patent: Feb. 10, 1987

[54] PRIORITY MASKING TECHNIQUES FOR VIDEO SPECIAL EFFECTS

[75] Inventor: Ralph Weinger, Philadelphia, Pa.

[73] Assignee: Color Systems Technology, Inc., Marina Del Rey, Calif.

[21] Appl. No.: 649,276

[22] Filed: Sep. 10, 1984

[51] Int. Cl.$^4$ .............................................. H04N 9/74
[52] U.S. Cl. ........................................ 358/22; 358/37; 358/166
[58] Field of Search ....................... 358/22, 80, 81, 82, 358/37, 28, 166, 183, 182; 340/747, 729, 723, 703

[56] References Cited

U.S. PATENT DOCUMENTS

| | | | |
|---|---|---|---|
| 3,771,155 | 11/1973 | Hayashi et al. | 340/703 |
| 4,149,185 | 4/1979 | Weinger | 358/81 |
| 4,156,237 | 5/1979 | Okada et al. | 340/729 X |
| 4,204,207 | 5/1980 | Bakula et al. | 340/723 |
| 4,356,511 | 10/1982 | Tsujimura | 358/182 X |
| 4,357,624 | 11/1982 | Greenberg | 358/22 |
| 4,360,831 | 11/1982 | Kellar | 358/182 |
| 4,420,770 | 12/1983 | Rahman | 358/183 |
| 4,509,043 | 4/1985 | Mossaides | 340/703 X |

*Primary Examiner*—Michael A. Masinick
*Attorney, Agent, or Firm*—Don A. Hollingsworth

[57] ABSTRACT

Method and apparatus for priority masking of video enhancement areas of a video picture. A first enhancement conversion formula is generated for enhancing a first segment of the video picture according to the first generated enhancement conversion formula. Similarly, a second enhancement formula for enhancing a second segment of the video picture according to the second enhancement conversion formula is generated. Priority of one conversion formula over the other in the area of overlap of the two segments is established by combining the first and second enhancement conversion formulas in a manner to produce the composite enhancement conversion formula in which one of the first and second enhancement conversion formulas has a degree of priority over the other enhancement conversion formula in the area of the video picture in which the overlapping occurs. The video picture is thus modified according to the composite enhancement conversion formula. When more than two segments having their individual enhancement conversion formulas, the composite enhancement conversion formula is established such that, in the area of common overlap of the three segments, one of the first, second, and third enhancement conversion formulas has a first degree of priority over the other two, and one of the other two enhancement conversion formulas has a second degree of priority over the other one thereof. In a preferred embodiment, the enhancement modification and conversion is the colorization of a black and white or an undesirably colored video picture.

40 Claims, 6 Drawing Figures

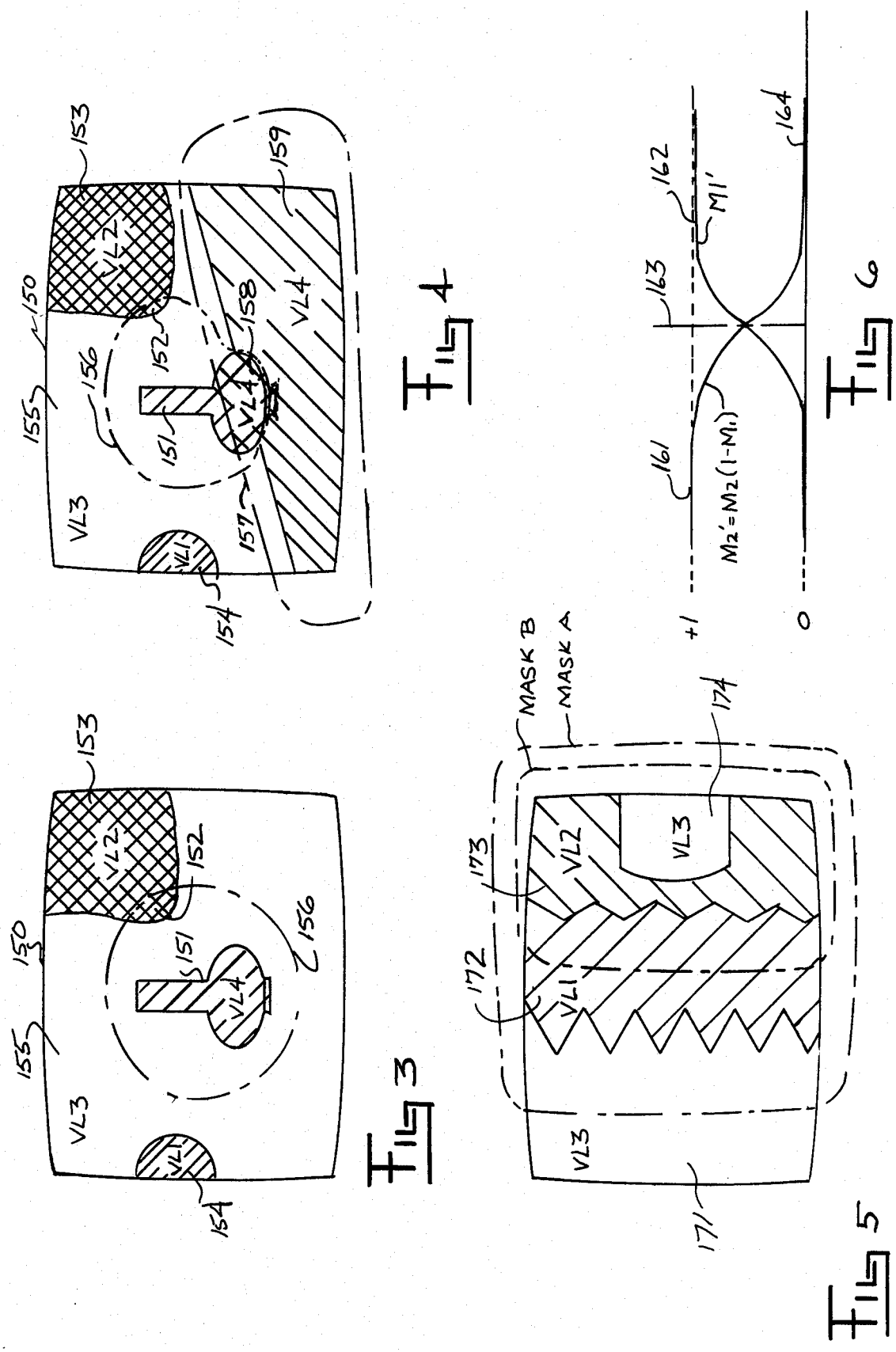

PRIORITY MASKING TECHNIQUES FOR VIDEO SPECIAL EFFECTS

BACKGROUND OF THE INVENTION

1. Field of the Invention

This invention relates to the field of video special effects, and more particularly, to a method and means for creating and establishing priority among a plurality of masks affecting the nature of a video picture.

2. Brief Description of the Prior Art

Masking techniques are known in which certain picture segments, known as masked areas, are modified or enhanced in accordance with a specified condition referred to herein as a conversion formula. Each conversion formula is operative within the boundaries of its masked area, and when two masked areas overlap, the area of the picture in which overlapping occurs is affected by the conversion formula of both segments combined. This combination of conversion formulas in the area of overlapping segments may be used to advantage to obtain interesting patterns or effects. It can, however, be deleterious to the overall enhancement scheme, especially when the enhancement effect is that of coloring previously black and white pictures or modifying the coloring of a previously colored picture.

The degrading effects of the combining of conversion formulas can be appreciated from the fact that, due to the light-emitting nature of the phosphor on the face of a picture tube, light emitted from the same area of the picture tube produced by video signals representing two different colors mixes according to a color additive process. For example, if two masks overlap and in the overlapped area, one displays a green color and the other displays a red color in a prescribed proportion to the green, then when the two colors are visually mixed on the face of a color picture tube or screen, the resultant color would be yellow. Since neither color substantially dominates the other, and since a yellow color is strikingly different than either red or green, if two objects are close together having red and green coloring, respectively, and the picture segments in which the respective color conversion formulas are operative overlap, the undesirable yellow hue will result.

In certain systems, such as those that use a computerized "color tablet" to "paint" a group of pixels in one solid color, the problem is avoided by not allowing any picture segments, or masks, to overlap. Accordingly, when one object moves into another, the colorizer technician reshapes the area of pixels and effectively manually prioritizes the colors of all areas of the picture. Alternatively, the computer in such a system can store characteristics of each pixel and make educated judgments as to changing positions of object shapes so as to "electronically" follow a moving object. In either case, however, when the system is confronted with one object moving into the other, or encounters the close proximity of two differently colored objects, a system operating in the manner just described becomes extremely slow in the coloring process, because the colorizer technician must carefully draw a large number of masked areas on the color tablet in precise relationship to the outlines of each object.

In prior art systems which operate on the basis of establishing a color conversion formula in which different colors are chosen on the basis of the luminance level of the picture within a prescribed area, a similar problem is encountered but of considerably less degree. A system which uses gray levels of the luminance signal for establishing colorization formulas will, nevertheless, often encounter objects that are closely positioned and/or move relative to other objects, such that the segments or masks, within which color conversion formulas are active, overlap. The net colorization formula in the area of mask overlap is thus some combination of the colorization formulas contributing in that area of overlap.

One such system using the gray level for establishing color conversion formulas can be found in my U.S. Pat. No. 4,149,185 issued Apr. 10, 1979, the disclosure of which is incorporated herein by reference in its entirety. In accordance with the system described in U.S. Pat. No. 4,149,185, the outputs of a plurality of multipliers are summed together to produce the picture components Y, R-Y, and B-Y, such components being combined to form a composite color video signal or RGB video signal for display on a monitor. Each of the three components has its separately summed multipliers, and each multiplier has as its two inputs a color conversion formula and a mask signal which enables the color conversion formula to be active only within a prescribed masked area of the picture.

Each multiplier receives its mask signal input from a mask generator, and each mask generator is operated totally independent of other mask generators. Accordingly, although each separate color conversion formula is affected by its associated multiplier for a particular designated area of the picture, nevertheless the independence of the mask generators and the standard summation technique used in summing the outputs of the multipliers result in a weighted colorization formula for picture elements of the same video level in any area where any two or more masks overlap, the weight of each color in the area of overlap being dependent upon the strength of that color according to the color conversion formula it represents.

As set forth in my prior U.S. Pat. No. 4,149,185, one of the most important advantages over the "pixellated" colorization technique is that, since gray levels are assigned specific colors, the movement of a colored object, or its proximity to other colored objects, does not result in any deleterious effects for so long as each gray level is to maintain its assigned color. When two masks overlap, however, there are occasions when problems arise if the same video gray level is assigned different colors for the two overlapping masks. While this is less of a problem with systems in accordance with my prior U.S. Pat. No. 4,149,185 than that of systems using colored pixel groups, there is nevertheless an established need for eliminating the problem of color-mixing in areas of the video picture at which two or more masks overlap. The present invention fulfills this need.

BRIEF DESCRIPTION OF THE INVENTION

The aforementioned deficiencies of the prior art are overcome by the present invention by the provision of a method and apparatus for priority masking of video enhancement areas of a video picture.

For the purposes of this description, and by way of example only and not intended to represent any limitation thereof, the enhancement characteristic of concern will be that of colorizing areas of a video picture. In this sense, "colorizing" and any form of the term is to be understood to mean either adding color to a previously all black and white picture or modifying the color of a previously colored picture in full or in part. It should be understood, however, that video enhancement using the priority masking techniques of the subject application can involve other picture parameters other than color.

For example, a variety of special effects such as wiping, split-screen, super imposition, keying, graphics, and the like are merely signal additions or alterations of exisiting video signals and may be employed under the control of a mask generator so that the special effect is operative or active only within a prescribed area on the screen.

Similarly, a variety of video image processors are standard equipment in video studios, an example being that of the Microtime Model 2100 video image processor. Such processors are in-line devices and provide variable control over such electrical parameters as video gain, chrominance gain, hue, and setup, as well as control over the amount of horizontal detail, vertical detail, and noise reduction desired. If combined with a mask generator so that the processor is only enabled or effective within the area defined by the mask generator, and if more than one mask is used at any one time, then the priority masking techniques of the present invention can beneficially apply.

Although the example to be discussed in this description is that of colorizing a picture, so as to appreciate the wide scope of application for the present invention, one might consider a simplified example of a moving image passing horizontally across a screen where a group of buildings, or the like, are spaced horizontally across the screen. A special effect can be generated wherein the moving object is to appear to be positioned in front of some of the buildings and behind others. This can be accomplished by keying a downstream signal adder based upon the gray level in the picture. To permit the moving object to pass in between, for example, two different buildings of the same gray level, the masking technique according to the subject application might by employed. In such a case, in the area of overlap between one such mask which is to enable the downstream adder and an adjacent mask which is to disable the downstream adder, priority may be given to the keying formula of the building or object that is to be in the foreground.

For the purposes of this description, the term "priority" is intended to mean having preference or superiority in position on the video monitor screen to all other elements effective at such position. The superiority need not be, and is often not, absolute. That is, the priority of any one mask may have any value between $-1$ and $+1$, the value $+1$ representing absolute priority, the value 0 representing no priority having no effect on the video picture, and the value $-1$ representing a negative priority essentially making the effects of all other masks more effective. In the latter example, a value of $-1$ for one mask can double the effects of all other masks operative in the same picture area.

It is further reiterated that my prior U.S. Pat. No. 4,149,185 is to be considered as incorporated by reference herein as representing a prior art colorization process and apparatus which can beneficially use the improvement according to the subject application. In my prior patent, an apparatus is disclosed for the conversion of black and white video signals to color video signals in which the black and white video signal is processed through a luminance (Y) channel and two color information (R-Y and B-Y) channels, the apparatus providing means for modifying the video signal in each channel in accordance with one or more operator-determined transfer functions. Each channel further provides means for further modifying the video signal as a function of area signals generated by separate sources. For each of the channels, a plurality of function generators may provide the signal conversion, while another plurality of multipliers set positional or area boundaries within which each color conversion formula from each function generator is to be operative. Importantly, the outputs of the multipliers, then representing color conversion formulas for separate but possibly overlapping areas, are summed together without any contributing color conversion formula having any priority in areas of the video picture in which overlapping occurs.

In the interest of consistency, in this description, where appropriate for ease of understanding and continuity, the term "mask" is equivalent to a specified segment of the video picture, and the term "area" is more generic and may refer to an entire picture, a picture segment, or fraction of a picture in which two or more segments overlap. Moreover, a color conversion formula will generally refer to that signal derived from a function generator which produces an output signal based upon an input black and white or color corrected signal. A composite luminance color conversion formula would refer to the video component resulting from the summing of all luminance function generators affected by the associated multipliers. Similarly, the R-Y and B-Y composite color conversion formulas would represent the summation of all R-Y and B-Y function generators, respectively, affected by the associated multipliers. Finally, the composite color video signal will refer to the encoded or combined Y, R-Y and B-Y signals, the composite color video signal being appropriate for applying to a color video monitor. If desired, an encoder may be used to produce an RGB signal for use with monitors equipped to handle RGB components.

Using the invention of my prior U.S. Patent as a basis, the individually produced mask signals, which define the aforementioned masked segments independent of one another, may be routed to a priority assignment device according to the present invention. In the priority assignment device, each mask signal is operated on by a mask processor to produce a prioritized mask signal as an output and a further priority function as an input to the next mask processor in line. The first-mentioned mask processor has the highest priority and has $+1$ as an input priority factor. The second mask processor then operates on the second mask signal to produce the second prioritized mask signal subject to the first mask signal and a second priority factor as an input to the third mask processor, and the number of mask processors is limited only by the design of the system and the wishes of the colorizer technician.

With the arrangement just described, a series of prioritized mask signal outputs are generated, one for each input mask signal, the priority assignment device having established priority among the mask outputs as contrasted with the independent character of the mask input signals.

While an order of priority is established in the priority assignment device, a number of options are available to the colorizer technician so as to make the system quite flexible and applicable to a wide variety of colorization needs. More specifically, a switching network may be employed if desired, the function of the switching network being that of ordering the separate non-prioritized mask signals according to a desired schedule of priority. Thus, any mask signal may be assigned any mask priority. This may be important in video pictures wherein moving objects vary from one side of the screen to the other or when severe camera zooming techniques are employed so that, for one scene a pre-established smaller mask signal may have a high priority prior to movement or zoom, and a larger mask might be preferred as having the higher priority after movement or zoom. In any event, the flexibility of the system is greatly enhanced by the provision of such a switching network.

Furthermore, each mask processor may be provided with a control switch for affecting either the transfer of the mask signal through the mask processor or of the mask signal as a priority factor to the next mask processor. For example, a control switch may be associated with each mask processor so as to bypass the mask processor for that particular mask signal. As a result, the mask signal passes through the processor without alteration, while the priority function is left unaltered so that mask processors of lesser priority will still be affected by the bypassed mask signal.

As another function adding to flexibility of the system, another control switch can be associated with each mask processor to allow passage of the overall priority factor through the priority assignment device without contribution by that mask signal. In other words, that selected mask processor will prioritize the mask signal applied, but the priority factor passed on to the mask processor of lesser priority will have no contribution of the selected mask signal. In this way, any mask can be precluded from affecting any mask of lesser priority.

The switching functions just described within the priority assignment device may, if desired, be set to pass all mask signals through the priority assignment device with a gain of +1 and with no priorities established whatsoever.

Finally, as an improvement over the basic invention, each mask generator can produce a mask with "soft edges", meaning that the colorization formula that is enabled by the mask is gradually enabled from a 0 value up to the full value of the color conversion formula internally of the mask.

BRIEF DESCRIPTION OF THE DRAWINGS

Other advantages and impovements over the basic system just described will be evident by reference to the attached drawings in which:

FIG. 3 is a representation of a video picture in which objects of different video levels are seen, and in which a mask around one of the displayed objects is shown;

FIG. 4 shows a similar view to that of FIG. 3 with the addition of another object and, with the addition of second mask, the creation of an overlapping mask situation;

FIG. 5 shows a simulated video picture with a specific colorization problem incorporating two overlapping masks solved by the invention according to the present invention; and FIG. 6 shows graphically the effects of soft edge masking.

DETAILED DESCRIPTION OF THE PREFERRED EMBODIMENTS

Figure 1:
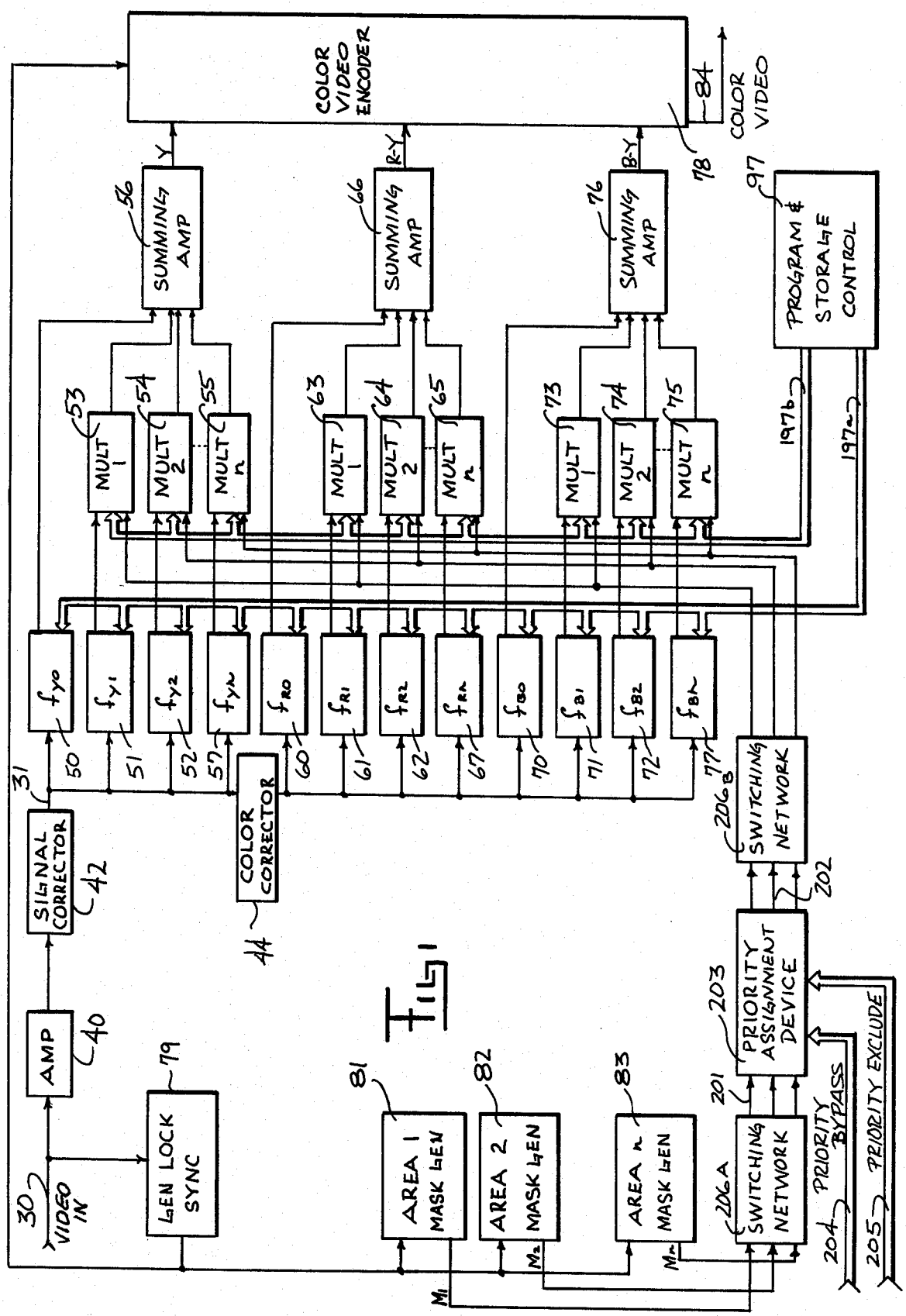
FIG. 1 is a block diagram of a colorization scheme to produce a composite color video signal from a black and white video input signal according to my prior U.S. Pat. No. 4,149,185, with employment of the switching network and priority assignment device improvement according to the present invention.

FIG. 1 is a modified version of FIG. 1 from my aforementioned U.S. Pat. No. 4,149,185. As with my earlier patent, the throughput function of the system shown in FIG. 1 is to receive a black and white video input signal, separate it into various components, process the separate components, and combine the processed components in a color video encoder to provide a color video output signal. Since difference colorization techniques are required for different areas of the picture to be modified, one or more area masks are generated and certain functions for modifying the input signal are operative only within the masked areas. The novel improvement according to the present invention concerns a priority assignment device for interrelating the masks produced, in such a way as to give priority in areas of mask overlap. A video input signal is shown in FIG. 1 as a black and white input signal on line 30. It is to be understood that the input signal could be a precolored video input whose colorization is to be altered, and the invention works equally well with such input signals.

The video input signal is routed to a genlock sync generator 79 to provide system sync, and to an amplifier 40 of conventional design which may provide overall video level and setup. A signal corrector 42 may provide video enhancement and/or initial overall transformation of the black and white signal, and is also an optional circuit block of conventional design. The processed output of signal corrector 42 is supplied to a number of functional generators 50-52 and 57 which independently operate on the input video signal to provide a specified video transformation function for either the entire picture area (through function generator 50) or within certain specified masked areas of the picture (through function generators 51, 52, and 57).

The outputs from function generators 51, 52, and 57 are routed, respectively, to multipliers 53-55. A second input to each multiplier is a video mask signal, each multiplier 53-55 receiving a different one of mask signals M1 through Mn from area mask generators 81-83. Multipliers 53-55 pass their respective input signals, with a multiplication factor of between zero and one within the respective masked area and inhibit (multiply by zero) passage of their input signals outside the mask area. The outputs of the function generator 50 and multipliers 53-55 are then summed in summing amplifier 56 to produce the luminance or "Y" signal.

The processed signal through signal corrector 42 may optionally pass through a color corrector device 44. This device provides a rough, or gross color inversion to the two color paths which ultimately produce the R-Y and B-Y signals. It should be noted that the color correction device 44, being primarily a coloring circuit, is applied only to the color channels that produce R-Y and B-Y, and is not applied to the luminance path that produces the Y signal.

Function generators 60-62 and 67, while operating on the input signal to provide the ultimate R-Y signal, function in the same manner as that described in connection with the luminance path involving function generators 50-52 and 57. Similarly, multipliers 63-65 and summing amplifier 66 are comparable in function to multipliers 53-55 and summing amplifier 56.

The third channel involving function generators 70-72 and 77, multipliers 73-75, and summing amplifier 76 likewise function together to form the B-Y signal.

Color video encoder 78, of conventional design, then combines the Y, R-Y, and B-Y signals to produce a conventional color video signal (composite or RGB) on line 84.

The flexibility of the system described to this point is well documented in my prior U.S. Pat. No. 4,149,185, and program storage and control unit 97 contributes substantially to the realization of such extreme flexibility. Reference is made to the discussion of the selection of breakpoints, video segment creation, video segment inversion, and the like in that document. In FIG. 1, herein, program storage and control 97 is shown to have a pair of multiline outputs 197a and 197b. This indicates that gain or function control over the color conversion formulas can be affected or altered either at the function generators themselves or at the multipliers fed by the function generators, or the combination of the two.

As shown in FIG. 1, a genlock sync generator 79 provides common synchronization to the color video encoder 78 and the mask generators 81-83. As is common in the art, when video processors require synchronization, a genlock sync generator may be used to sample a video input signal and develop composite or non-composite sync to render the various components of the system time compatible. In the development of masks used with this invention, of course, such synchronization of the mask generators is essential. The manner in which mask synchronization is accomplished is well within the knowledge of the skilled worker and will not be discussed in detail here. It is sufficient to state that all of the masks generated in mask generators 81-82 are synchronously compatible with the outputs of the corresponding function generators which produce color conversion formulas to be operative within the masked areas. Again, the general masking technique is fully explained in my prior U.S. patent.

Having the basic masking process in mind, the manner of color correcting and/or generating using the arrangement of FIG. 1 has proven to be effective as an operable system. However, from FIG. 1 it can be seen that the outputs of multipliers 63-65, for example, are summed together in summing amplifier 66, thereby resulting in some contribution to the R-Y signal from the respective function generators through multipliers 63-65. That is, in any area of overlap of masks M1-Mn, the video picture at the area of common overlap and of the same video level will be affected by the color conversion formulas representing each masked area. Of course, the R-Y signal may have any range of voltages throughout the system, at the discretion of the designer. If desired, the R-Y level can be maintained within a specified voltage range, requiring factoring or other limiting of the outputs of multipliers 63-65 or the summation thereof in summing amplifier 66. In either case, for best control over the mix, the summation is arithmetic and algebraic, and the area of the picture in which the three masks, or any two of them, overlap will be modified by such summation of the color conversion formulas effective in that area of overlap.

As a result of the aforementioned summing of formulas in the area of mask overlap, if the colorization technician desires to change the color conversion formula operative within a first mask in order to effect a desirable change in the non-overlapped portion of the picture within that first mask, necessarily the area of that first mask that is overlapped by one or more other masks will also be affected. As a result, one or more of the other formulas operative in other masks must be changed to accommodate, and this may undesirably change colors in the non-overlapped area of the said other masks. Alternatively, a redesign of the mask boundaries may be necessary to prevent the overlapping from occurring, and this may be difficult under certain conditions. The circuitry of priority assignment device 203 eliminates these problems associated with mask overlapping.

It should also be recalled from my prior patent that, in the preferred embodiments, each colorization formula contains a series of terms each of which produce a predetermined color for a corresponding predetermined gray level of the original picture. It should be readily apparent, then, that even when two masks overlap, if none of the terms of one colorization formula within one of the masks is the same as one of the terms in the other mask, then there is no conflict between the two masks. In this case, no priority is needed. That is, one colorization formula in one mask will specify certain colors for the different video levels contained therein. The same analysis applies to the second mask in the same manner, and thus it is obvious that the only time two overlapping masks are in conflict is when each of the overlapping masks is functionally prepared to color that common gray level its own predetermined color. The results, of course, is a mixture of the colorization hues from the two mask formulas. Sometimes this is desirable and sometimes it is not. The present invention considers the case when it is not.

This would be especially troublesome if one object of a particular gray level in a scene moved across another object of a different color, but of the same gray level. Assuming the mask for the moving object is a "first" mask, and the mask for the stationary object is a "second" mask, then, although both the moving and stationary objects have the same gray level, the mixture of the two color formulas when the moving object passes in front of the fixed object would be avoided if the "first" mask had priority over the "second" mask. In this example, of course, the "first" mask would have to have very close boundaries to the moving object when passing in front of the stationary one, but the example of a need for priority masking is clearly seen. Other examples of application of a priority masking technique will be discussed later in connection with FIGS. 5 and 6.

Switching network 206A receives the mask signals M1,M2,Mn and merely routes them through to any of an equivalent number of output lines, but in an order desired by the colorization operator. Network 206B operates similarly on the outputs of priority assignment device 203. Switching networks are off-the-shelf items, sometimes referred to as routing switchers, and may even be implemented with passive mechanical switches. The importance of such a switching network, however, may be realized by the moving object example just discussed. It is conceivable, of course, that the moving object may have dominance over a stationary object of equal video level in one part of the picture and then move behind a similar stationary object, also of the same video level, in another part of the picture. The function of the switching networks 206A and 206B is thus to assign the relative mask priorities between all the masks, and this can be done by computer, manually, or under program control. Alternatively, instead of merely switching the inputs and outputs to priority assignment 203 a switching network can be incorporated within device 203 by merely reassigning the priority of the function blocks therein without rerouting the inputs and outputs to the function blocks. This will be better understood when the priority assignment device 203 is discussed in connection with FIG. 2.

Finally, control signals on the individual lines of multiple cable 204 from an operator's control panel permit bypassing of any mask through device 203 without attachment of any priority thereto. In a somewhat complementary manner, a set of control signals from the operator control panel may be applied through cable 205 to exclude any mask from having any priority effects on masks of lesser priority. The priority bypass and priority exclude functions will be discussed thoroughly in connection with FIG. 2.

Figure 2:
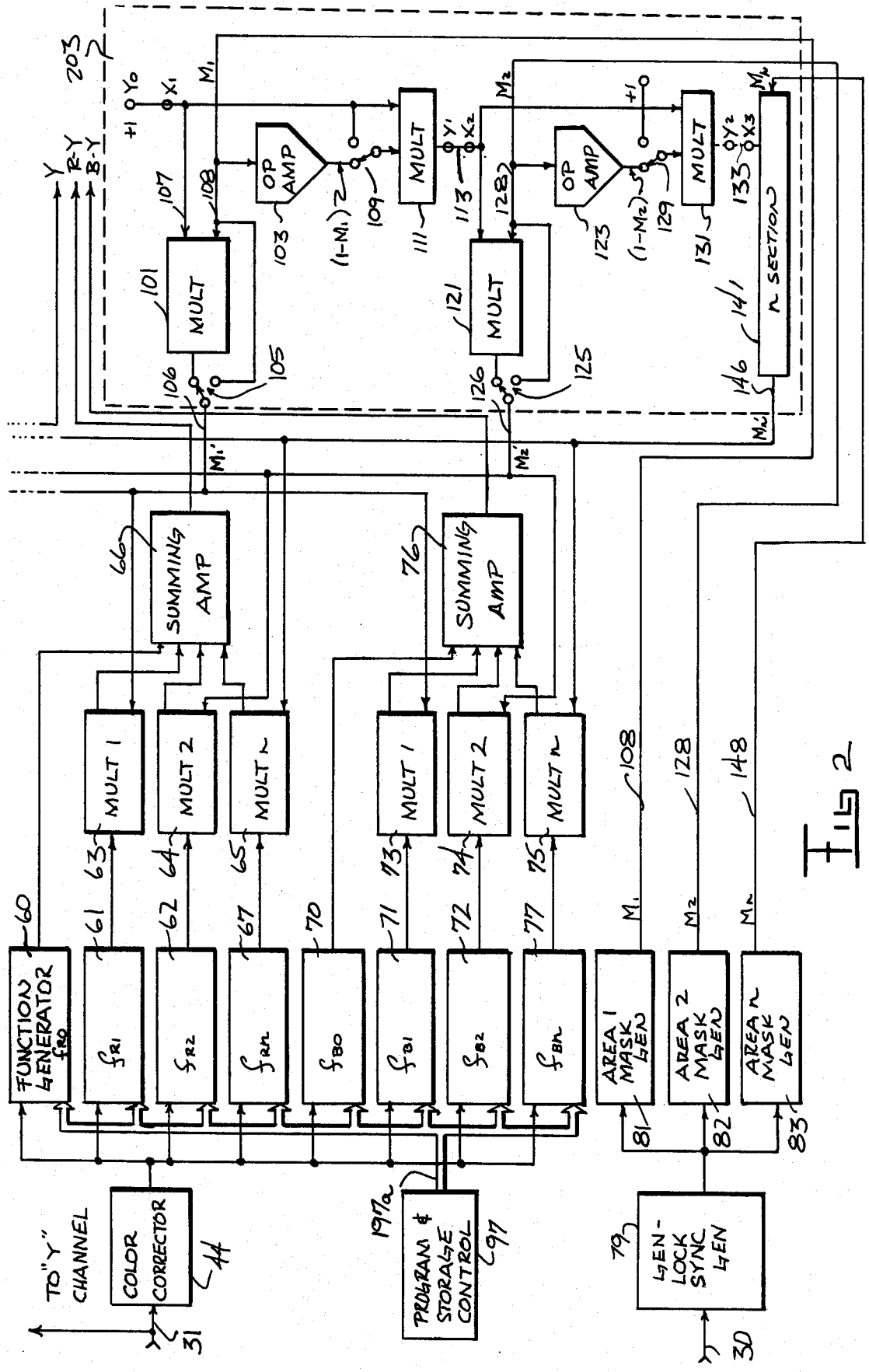
FIG. 2 is a partial view of the prior art portion of FIG. 1 with an expanded and more detailed view of the priority assignment device.

Turning now to FIG. 2, there is shown a more detailed drawing showing a portion of the circuit of FIG. 1 which creates the R-Y and B-Y signals and generates the area masks. Before analyzing the manner in which priority is established for each mask, it is important to recognize that the mask priority assignment device 203 is operative on the mask itself and is not directly involved in the colorization formulas produced by function generators 50-52, 57, etc. That is, each function generator generates a color conversion formula that presets a condition for the Y (luminance) channel, the R-Y (red minus luminance) channel, the B-Y (blue minus luminance) channel, and indirectly by the mathematical manipulation of color video encoder 78 (FIG. 1) a G (green) channel, the G signal being derived from the basic formula G=Y-B-R as is common knowledge in the art.

Accordingly, the video signal passing through the circuit of FIG. 2 is twice multiplied, namely first in accordance with the associated function generator (for example fR1) and secondly in accordance with the area mask multiplier (for example multiplier 63). The inputs from each multiplier 63-65 and function generator 60 to summing amplifier 66 is processed according to known methods by normalizing the four input signals such that the overall multiplication factor contributed by the different elements in the chain has a maximum value of 1. It can thus be seen that the invention herein lies not in the choosing of colors within each mask, but rather in the establishment of an order of priority for the different masks within the areas of overlap between them, and the priority assignment device effectively becomes the normalizing function for the summation of the masks at the inputs to the separate summing amplifiers 56, 66, 76.

In the following discussion, the three components Y, R-Y, and B-Y are selected for discussion purposes. However, it is to be understood that other three-component systems, (such as RGB systems; Y, I, Q systems; or the like) could beneficially use the present invention.

Without priority assignment device 203, the circuit of FIG. 2 would merely pass on each mask M1, M2, Mn to its associated multiplier. In view of the fact that the function generators shown in FIG. 1 are grouped into luminance, R-Y, and B-Y channels, the discussion of FIG. 2 will use the R-Y channel as exemplary, and it will be understood that the luminance and B-Y channels follow with a similar analysis. In this light, without priority assignment device 203, the area mask M1 would be applied to multiplier 63, mask M2 to multiplier 64, and Mn to multiplier 65.

However, with device 203 operative, the area masks M1, M2, Mn are assigned values in accordance with an order of priority to produce corresponding prioritized masks M1', M2', and Mn'. As has been emphasized above, the priority is established only in the areas of mask overlap. Mask M1 is applied over line 108 to the input of an operational amplifier 103, a multiplier 101, and a bypass switch 105. In the condition shown in FIG. 2, the bypass switch is shown thrown to the non-bypass position. A signal level +1 is shown to be applied on line 107 to the second input of multiplier 101, to another multiplier 111, and to one contact of a switch 109 which will be referred to herein as an "exclude" switch. The individual components of priority assignment device 203 are off-the-shelf items with standard adjustments made to accomplish the desired transfer functions. Thus, multipliers 101 and 111 merely pass the input signals through to the output with a straight analog multiplication, and since the mask values can range from zero to one, the maximum output of bypass switch 105, designated M1' on line 106 has the same maximum value of one.

An analog implementation of the invention will be discussed in connection with FIG. 2. However, a digital version would be apparent to the skilled artisan once he or she becomes familiar with the concepts set forth in this description. That is, functionally arranged microprocessor flow charts can be readily structured so as to enable the invention to be practiced using custom designed digital circuitry or equivalent microprocessor software control with computers available in a variety of different architectures. The analog version was chosen as a preferred embodiment for discussion because it is considered the best mode contemplated in terms of simplicity, ease of implementation, and flexibility of certain operational functions.

The circuit components of device 203 so far discussed represent the highest priority section, and a similar section is shown by the interconnection of multipliers 121, 131, operational amplifier 123, bypass switch 125, and exclude switch 129. The latter-mentioned components operate on the M2 mask, and the internal interconnections for the M2 section are the same as that for the M1 section, with the sole exception being that the second input to multipliers 121 and 131 is not a multiplying factor +1, but rather is the output of multiplier 111 on line 113 from the M1 section.

With the switches thrown to the positions shown in FIG. 2, the mask M1, being multiplied in multiplier 101 by the factor +1, is outputted through bypass switch 105 as mask M1' on line 106. Thus, the formula M1'=M1 is established by the M1 section. Operational amplifier 103 is configured to provide an output (1−M1), and this signal, being multiplied by +1 in multiplier 111, is the signal present on line 113.

In the M2 section, then, multiplier 121 has as its two inputs the mask M2 and the value (1−M1) on line 113. The output of bypass switch 125, on line 126, consequently has the formula M2'=M2(1−M1).

Since the input to multiplier 131 from exclude switch 129 is (1−M2), and the second input to multiplier 131, on line 113, is (1−M1), the output of multiplier 131 on line 133 produces the formula (1−M2)(1−M1).

This analysis can be extended through any number of priority sections of device 203, such that the output from the Mn section 141 produces the formula $Mn'=Mn(1-M_{n-1})\ldots(1-M2)(1-M1)$. The "prioritized" set of masks M1', M2', Mn' are the new mask values applied to multipliers 63-65, and an order of priority has now been established between the series of masks.

For example, as explained earlier, each mask can have any value between zero and one in the area of the video picture within its established boundaries created by the area mask generators 81-83. This would permit application of a colorization formula in the area of the mask on a video picture in a manner similar to the effect commonly seen in television broadcasting, in which the isolated face of a performer is gradually faded in or out, or dissolved, the intensity of the superimposition of the face of the performer being proportional to the magnitude of the masked video segment mixed with the full picture video signal. As applied in the instant case, rather than a separate video picture being added to the designated area of the full video picture, a colorization formula is developed for adding, or subtracting, from the preexisting black and white luminance level. The same mixing concept is involved, however, and the priority assignment device 203 of the present invention can be applied in the area of special effects for merging several masked video segments in an array of overlapping superimpositioned picture segments.

In any event, since M1'=M1, the full value of M1 appears as the multiplication factor in multiplier 63. If M1=+1, then the value (1−M1) sent to multiplier 121 in the next section in priority, the M2 section, would have as one of its inputs, on line 113, the value 0. Since, as explained earlier, the (1−M1) value appears in each formula of masks of lesser priority, all masks M2'... Mn' would have the value 0 as well. Thus, in the area of overlap between the M1 mask and any other mask, the color conversion formula enabled by mask M1 would be fully effective, and all of the color conversion formulas associated with all other masks would be deleted.

It should be noted that in areas outside the boundaries of mask M1, M1 has the value 0. Accordingly, in a situation where a pair of masks M2 and M3 overlap, the value (1−M1) becomes +1, and mask M2 has full priority over mask M3 without any priority effects contributed by mask M1.

Since any mask can have values other than 1, the flexibility of the system becomes more apparent by assuming the mask M1 to have a value of 0.7. In such a case, the value (1−M1) has the value 0.3, and that value is applied to multiplier 121 to produce the formula for mask M2'=0.3M2. Obviously, an infinite number of combinations of priorities can be established when considering the priority effects generated in device 203 and the fact that outside any area of one mask, prioritites are maintained as to the other masks having overlapping areas.

To add even further to the flexibility of the system, the priority bypass switches 105, 125, can be thrown to the down position shown in FIG. 2, in which case the mask associated with that switch is passed through the device 203 without alteration. However, the input mask M1, for example, still passes through operational amplifier 103 to provide as an input to multipliers 121 and 131 the value (1−M1). The same applies to the M2 section, such that for any section not having its priority bypass switch thrown, the priority effects of the masks of higher priority still, nevertheless, apply. If the priority bypass switch of mask M3 (not shown) was not thrown to the bypass position, the third section of device 203 would still produce the formula M3'=M3(1−M2)(1−M1) as before, independent of the positions of bypass switches 105, 125.

The priority exclude switches 109, 129 remove the priority effects of the associated mask from the mask formulas of those of lesser priority. For example, if switch 109 is thrown to the left and switch 129 is thrown to the right, then multiplier 131 would receive as inputs, the value +1 from switch 129 and the value (1−M1) on line 113. The multiplier 131 thus outputs the formula (1−M1). This results in the formula for mask M3' (not shown) to have the relationship M3'=M3(1−M1), the formerly contributing factor (1−M2) being "excluded" from the mask formulas in sections of lesser priority.

As alluded to earlier in the discussion of FIG. 1, the importance of switching networks 206A and 206B can now be appreciated. Since priority assignment device 203 is merely an operational unit independent of the character of any particular mask, the mask applied to line 108 has the highest priority, the mask applied to line 128 the next highest priority, and so forth. As also mentioned, a simplistic approach to changing the order of priorities of M1, M2, Mn would be merely to exchange corresponding inputs and outputs of priority assignment device 203 as between the different mask signals. Having now analyzed the inner workings of device 203, it can be observed that an approach using fewer switching elements and signal lines can be implemented by judiciously rerouting the source terminals, marked "X" in FIG. 1, and the exit terminals, marked "Y" in FIG. 1. For example, if X1 and X3 were exchanged and Y0 and Y2 were exchanged, simultaneously, then the order of priority would be altered to give mask M3 the highest priority, M2 the next highest, M1 the next highest, etc. The formula for mask M3' would then be M3'=M3, and the formula for mask M1 would be M1'=M1(1−M2)(1−M3).

Since the implementation of an operable switching network 206 would be obvious to the skilled worker, details are not offered in this discussion, and the design of same can be left to any skilled technician.

In FIGS. 3 and 4, a hypothetical application of the present invention is illustrated. FIG. 3 shows three objects 151, 153, and 154 on a video monitor having a background 155. The objects and background have different video levels associated with them, the object 151 having a video level VL4, object 153 having a video level VL2, object 154 having a video level VL1, and the background 155 having a video level VL3. As with my prior invention in U.S. Pat. No 4,149,185, a mask 156 is created to roughly encompass the object 151. A portion of the created mask 156 includes a piece of object 153. A specified color conversion formula is created within mask 156, and using the segmented video level technique explained in my prior patent, only the object 151 will be colored according to the associated color conversion formula. The piece of object 153 within mask 156 will not be colored, since its video level, VL2, does not lie within the amplitude segment to which the color conversion formula applies. FIG. 3 thus represents a typical colorization example that would be performed by the prior art.

FIG. 4 is similar to that of FIG. 3, with the addition of a further background object 159 having a video level VL4, the same as that of object 151. If object 151 is to be red in color, and the background object 159 is to be green, it would be expected, using prior art techniques, that the area of overlap between mask 156 outlining object 151 and mask 157 outlining the background object 159 would result in a yellowish color in the area 158 of object 151. The present invention can be used to effectively carve out a segment from background object 159 and color it in accordance with the video level VL4 within mask 156. The same video level, VL4, within mask 157 would have a green formulation, but due to the priority of mask 156 over mask 157, as would be the case if mask 156 was substituted for mask M1 in FIG. 2, a factor in the mask M2 formula is $(1-M1)=0$. As a result, the area 158 of object 151 would be nonaffected by the colorization of the lesser priority mask 157. Of course, since both object 151 and background object 159 are of the same video level, a close fit of mask 156 around object 151 within the video level VL4 of mask 157 would be necessary. It will be observed, however, that a close fit is not necessary where the two objects 151 and 152 do not overlap (i.e. at the top portion of area 158).

An alternate application of the present invention can be appreciated by reference to FIG. 5 in which three video levels are shown in regions 171-174, the video level in region 171 being the same as that of 174. Let it be assumed that region 171, although the same video level as 174, is to be colored differently than region 174.

Referencing FIGS. 1 and 2, the non-masked function generators 50, 60 and 70 are adjusted so that video level VL3 has a certain color character. Since the entire picture area is affected, regions 171 and 174 will have the same color character. Next, mask A is set to apply a colorization formula only for the video level VL1. That is, the colorization formula controlled by mask A adds no colorization terms for video levels VL2 and VL3. Finally, mask B enables a colorization formula which sets the color characteristics of video levels VL1 and VL2, coloring video level VL1 the same as that of mask A. Again, region 174 is unaffected by mask B. Using the concepts of the present invention, mask B is set to have a priority over mask A so as not to double-color region 172.

Without priority, the piece of region 172 within mask B would be double-colored, and, to avoid this it would be necessary to conform the left edge of mask B precisely to the irregular left edge of region 173. This would be a time-consuming task, and in the event of a moving object represented by regions 172 and/or 173 would require an operator to meticulously draw the left edge of mask B for each frame of the scene. Assigning a priority to mask B, however, eliminates both the problem of outlining the left edge of mask B to an irregular outline and to account for any movement of the line of discontinuity between regions 172 and 173, provided that that line of discontinuity remains within the masked regions shown.

Of course, minor circuit tolerances in the creation of the two separate colorization formulas for masks A and B to color region 172 with the same color for video level VL1 can exist and might not be possible to eliminate entirely. This may cause a slight observable discoloration at the transition between masks A and B in region 172. Such an effect can be eliminated by giving the edges of mask B a soft-edged or "blurred" character.

Soft-edged masking techniques are known in the art and are used extensively in standard television broadcasting. Basically, a hard-edged mask causes an abrupt change in the combined mask signal and background signal. By smoothing, in time, the mask edges, the full amplitude mask will rise and fall, in time, at a prescribed rate. If mask B in FIG. 5 were soft-edged, then the slight discoloration at the transition between masks A and B would be such that the edge would be invisible. Since mask B has a priority over mask A, and following along the picture left to right in FIG. 5, as mask B's left edge is approached, a gentle transition between the effects of the colorization formula in mask A and that of mask B would be produced. This is illustrated in FIG. 6, where mask A has the value M2', mask B has the value M1', and the left edge of mask B is represented by the curved line 162 showing a gradual rise from a 0 level to a +1 level. Observing from FIG. 2 and the associated description that mask $M2'=M2(1-M1)$ and $M1=M1'$, these mathematical relationships produce the curve shown at 161 in FIG. 6, the latter-mentioned curve being complementary to the curve 162 and symmetrical about line 163 at which the juxtaposed masks are equal in magnitude. It can be seen that well to the right of the left of mask B there is no contribution from mask M2', and the transition will be absolutely invisible. The illustration example of FIGS. 5 and 6 suggests a technique which eliminates the need to follow exact edges or movements of edges that remain within their prescribed mask areas. Accurate edge coloring is thus accomplished without the operator following the exact edge.

Using the concepts of the invention described herein, it would be obvious that other specialized masking situations would arise in which the priority effects possible with the present invention could be implemented to a great benefit. Both ease of creating the masks, as exemplified in the situation discussed in connection with FIG. 5, and lower cost in terms of saving time not having to readjust previously fixed color formulas due to the interrelationships between colorization formulas as in a non-priority system are realized.

It must also be appreciated that mask generation can be implemented by analog devices or digital devices with or without the masks being defined by discrete pixel units. Moreover, virtually every control function and mathematical function can be performed by a computer under control of intelligent software. Similarly, the switching networks 206A and B and the bypass and exclude switches 105, 109, 126, 129 can be as simple as conventional mechanical devices or as complex as microprocessor controlled electronic switches available in a variety of functional configurations, silicon chip sizes, and packaging.

The need for mask priority as discussed in this description is not suggestive that the blending of video effects at the mask edges is undesirable. Rather, this invention should be considered as a novel video special effect that is just one of many effects that the operator has at his or her option. When it is benificial that the enhancement effects are to have an order of priority, that should be available to the operator, and when no priority or the interesting effects of a negative priority would benefit, that choice should also be avaliable. The embodiment of the invention described herein provides these choices.

What has been presented in the foregoing are preferred embodiments of the present invention, and it is clear that modifications and variations will be apparent to those skilled in the art and yet remain within the scope of the present invention. Accordingly, the present invention is to be limited only by the scope of the claims appended hereto.

I claim:

1. A method for priority enhancement modifying a specified area of a video picture, comprising the steps of:
   generating a first area enhancement conversion signal for enhancing a first segment of said video picture according to said first area enhancement conversion signal;
   generating a second area enhancement conversion signal for enhancing a second segment of said video picture according to said second area enhancement conversion signal, said second segment, at least in part, overlapping at least a part of said first segment;
   combining said first and second area enhancement conversion signals in a manner to produce a composite enhancement conversion signal in which a selected one of said first and second area enhancement conversion signals has a degree of priority over the other of said area enhancement conversion signals in the area of said video picture in which said segment overlapping occurs; and
   enhancement modifying said first and second video picture segments according to said composite enhancement conversion signal, while enhancement modifying said area of said video picture in which said segment overlapping occurs in accordance with said selected enhancement conversion signal relative to the nonselected enhancement conversion signal in proportion to said degree of priority.

2. The method as claimed in claim 1, including the step of:
   generating a third area enhancement conversion signal for enhancing a third segment of said video picture according to said third area enhancement conversion signal, said third segment, at least in part, overlapping at least a part of the first segment overlapped by said second segement; and wherein said combining step combines said first, second, and third area enhancement conversion signals in a manner to produce a composite enhancement conversion signal in which, in the area of common overlap of the three segments, one of said first, second, and third area enhancement conversion signals has a first degree of priority over the other two, and one of said other two area enhancement conversion signals has a second degree of priority over the other one of said other two area enhancement conversion signals.

3. The method as claimed in claim 2, wherein said first degree of priority dominates over said second degree of priority.

4. The method as claimed in claim 3, wherein, in any area of overlap between said first, second, and third segments, outside said area of common overlap, the same relative degree of priority is maintained.

5. The method as claimed in claim 4, including the step of selectably enhancement modifying any of said picture segments according to its corresponding area enhancement conversion signal without any priority effects for the selected segment.

6. The method as claimed in claim 5, wherein said step of selectably enhancement modifying any of said picture elements is performed without diminishing the priority effects said selected segment has on segments having area enhancement conversion signals of lesser priority.

7. The method as claimed in claim 5, wherein said step of combining combines all area enhancement conversion signals for all picture segments, including those of said selected segments, maintaining said degrees of priority for all area enhancement conversion signals except those of said selected segments.

8. The method as claimed in claim 1, including the step of selectably enhancement modifying said second segment of said video picture in the absence of any priority by said first enhancement conversion signal, in said area of segment overlapping.

9. The method as claimed in claim 2, including the step of selectably eliminating the priority effects of any area enhancement conversion signal in segments having area enhancement conversion signals of lesser priority.

10. The method as claimed in claim 9, wherein said step of selectably eliminating the priority effects of any area enhancement conversion signal is performed without affecting any priority effects in segments having area enhancement conversion signals of higher priority.

11. The method as claimed in claim 9, wherein said step of combining combines all area enhancement conversion signals for all picture segments, including those of selected segments whose area enhancement conversion signal priorities have been eliminated, maintaining said degrees of priority for all area enhancement conversion signals except those whose priority effects have been eliminated.

12. An apparatus for priority enhancement modifying a specified area of a video picture, comprising:
   means for generating a first area enhancement conversion signal;
   means for enhancing a first segment of said video picture according to said first area enhancement conversion signal;
   means for generating a second area enhancement conversion signal;
   means for enhancing a second segment of said video picture according to said second area enhancement conversion signal, said second segment, at least in part, overlapping at least a part of said first segment;
   means for combining said first and second area enhancement conversion signals in a manner to produce a composite enhancement conversion signal in which one of said first and second area enhancement conversion signals has a degree of priority over the other of said area enhancement conversion signals in the area of said video picture in which said segment overlapping occurs; and
   means for enhancement modifying said first and second video picture segments according to said composite enhancement conversion signal, while enhancement modifying said area of said video picture in which said segment overlapping occurs in accordance with said selected enhancement conversion signal relative to the nonselected enhancement conversion signal in proportion to said degree of priority.

13. The apparatus as claimed in claim 12, including:
   means for generating a third area enhancement conversion signal;
   means for enhancing a third segment of said video picture according to said third area enhancement conversion signal, said third segment, at least in part, overlapping at least a part of the first segment overlapped by said second segment; and wherein said means for combining combines said first, second, and third area conversion signals in a manner to produce a composite enhancement conversion signal in which, in the area of common overlap of the three segments, one of said first, second, and third area enhancement conversion signals has a first degree of priority over the other two, and one of said other two area enhancement conversion signals has a second degree of priority over the other one of said other two area enhancement conversion signals.

14. The apparatus as claimed in claim 13, wherein said first degree of priority dominates over said second degree of priority.

15. The apparatus as claimed in claim 14, wherein said combining means is operative, in any area of overlap between said first, second, and third segments, outside said area of common overlap, to maintain the same relative degree of priority.

16. The apparatus as claimed in claim 15, including means for selectably enhancement modifying any of said picture segments according to its corresponding area enhancement conversion signal without any priority effects for the selected segment.

17. The apparatus as claimed in claim 16, wherein said means for selectably enhancement modifying any of said picture elements is operative without diminishing the priority effects said selected segment has on segments having area enhancement conversion signals of lesser priority.

18. The apparatus as claimed in claim 15, wherein said combining means includes means for combining all area enhancement conversion signals for all picture segments, including those of said selected segments, while maintaining said degree of priority for all area enhancement conversion signals except those of said selected segments.

19. The apparatus as claimed in claim 12, including means for selectably enhancement modifying said second segment of said video picture in the absence of any priority by said first area enhancement conversion signal, in said area of segment overlapping.

20. The apparatus as claimed in claim 13, including means for selectably eliminating the priority effects of any area enhancement conversion signal in segments having area enhancement conversion signals of lesser priority.

21. The apparatus as claimed in claim 20, wherein said means for selectably eliminating the priority effects of any area enhancement conversion signal is operative without affecting any priority effects in segments having area enhancement conversion signals of higher priority.

22. The apparatus as claimed in claim 20, wherein said means for combining includes means for combining all area enhancement conversion signals for all picture segments, including those of selected segments whose area enhancement conversion signal priorities have been eliminated, while maintaining said degrees of priority for all area enhancement conversion signals except those whose priority effects have been eliminated.

23. An apparatus for priority enhancement modifying a specified area of a video picture, comprising:
means for generating a first area enhancement conversion signal for enhancing a first segment of said video picture according to said first area enhancement conversion signal;
means for generating a second area enhancement conversion signal for enhancing a second segment of said video picture according to said second area enhancement conversion signal, said second segment, at least in part, overlapping at least a part of said first segment;
a first mask generating means for generating a first electronic picture segment mask within which said first area enhancement conversion signal is to be operative;
a second mask generating means for generating a second electronic picture segment mask within which said second area enhancement conversion signal is to be operative;
means for coupling respective area enhancement conversion signal generating means and said first and second mask generating means to produce respective first and second area enhancement conversion signals operative only within the boundries of the respective electronic picture segment mask;
summing means for summing the masked first and second area enhancement conversion signals to produce a composite enhancement conversion signal;
priority generating means coupled between said first and second mask generating means and said combining means for setting a degree of priority of one of said first and second area enhancement conversion signals over the other of said area enhancement conversion signals in the area of said video picture in which said overlapping occurs; and
means for enhancement modifying said video picture according to said composite enhancement conversion signal.

24. A method for priority enhancement modifying a specified area of a video picture, comprising the steps of:
generating a first area enhancement conversion signal for enhancing a first segment of said video picture according to said first area enhancement conversion signal;
generating a second area enhancement conversion signal for enhancing a second segment of said video picture according to said second area enhancement conversion signal, said second segment, at least in part, overlapping at least a part of said first segment;
generating a first electronic picture segement mask with which said first area enhancement conversion signal is to be operative;
generating a second electronic picture segment mask within which said second area enhancement conversion signal is to be operative;
enabling respective first and second area enhancement conversion signals only within the boundries of their respective electronic picture segment mask;
summing the masked first and second area enhancement conversion signals to produce a composite enhancement conversion signal;
setting a degree of priority of one of said first and second area enhancement conversion signals over the other of said area enhancement conversion signals in the area of said video picture in which said overlapping occurs; and
enhancement modifying said video picture according to said composite enhancement conversion signal.

25. A method for priority color modifying a specified area of a video picture, comprising the steps of:
- generating a first area color conversion signal for color converting a first segment of said video picture according to said first area color conversion signal;
- generating a second area color conversion signal for color converting a second segment of said video picture according to said second area color conversion signal, said second segment, at least in part, overlapping at least a part of said first segment;
- combining said first and second area color conversion signals in a manner to produce a composite color conversion signal in which one of said first and second area color conversion signals has a degree of priority over the other of said area color conversion signals in the area of said video picture in which said segment overlapping occurs; and
- color modifying said video picture according to said composite color conversion signal.

26. The method as claimed in claim 25, including the step of:
- generating a third area color conversion signal for color converting a third segment of said video picture according to said third area color conversion signal, said third segment, at least in part, overlapping at least a part of the first segment overlapped by said second segment; and wherein
- said combining step combines said first, second, and third area color conversion signals in a manner to produce a composite color conversion signal in which, in the area of common overlap of the three segments, one of said first, second, and third area color conversion signals has a first degree of priority over the other two, and one of said other two area color conversion signals has a second degree of priority over the other one of said other two area color conversion signals.

27. The method as claimed in claim 26, wherein said step of combining combines all area color conversion signals for all picture segments, including those of said selected segments, maintaining said degrees of priority for all area color conversion signals except those of said selected segments.

28. The method as claimed in claim 25, including the step of selectably color modifying said second segment of said video picture in the absence of any priority by said first area color conversion signal, in said area of segment overlapping.

29. The method as claimed in claim 26, including the step of selectably eliminating the priority effects of any area color conversion signal in segments having area color conversion signals of lesser priority.

30. An apparatus for priority color modifying a specified area of a video picture, comprising:
- means for generating a first area color conversion signal;
- means for color converting a first segment of said video picture according to said first area color conversion signal;
- means for generating a second area color conversion signal;
- means for color converting a second segment of said video picture according to said second area color conversion signal, said second segment, at least in part, overlapping at least a part of said first segment;
- means for combining said first and second area color conversion signals in a manner to produce a composite color conversion signal in which one of said first and second area color conversion signals has a degree of priority over the other of said area color conversion signals in the area of said video picture in which said segment overlapping occurs; and
- means for modifying said video picture according to said composite color conversion signal.

31. The apparatus as claimed in claim 30, including:
- means for generating a third area color conversion signal;
- means for color converting a third segment of said video picture according to said third area color conversion signal, said third segment, at least in part, overlapping at least a part of the first segment overlapped by said second segment; and wherein
- said means for combining combines said first, second, and third area color conversion signals in a manner to produce a composite color conversion signal in which, in the area of common overlap of the three segments, one of said first, second, and third area color conversion signals has a first degree of priority over the other two, and one of said other two area color conversion signals has a second degree of priority over the other one of said other two area color conversion signals.

32. The apparatus as claimed in claim 31, wherein said combining means includes means for combining all area color conversion signals for all picture segments, including those of said selected segments, while maintaining said degrees of priority for all color conversion signals except those of said selected segments.

33. The apparatus as claimed in claim 30, including means for selectably color modifying said second segment of said video picture in the absence of any priority by said first area color conversion signal, in said area of segment overlapping.

34. The apparatus as claimed in claim 33, including means for selectably eliminating the priority effects of any area color conversion signal in segments having area color conversion signal of lesser priority.

35. The apparatus for priority color modifying a specified area of a video picture, comprising:
- means for generating a first area color conversion signal for color converting a first segment of said video picture according to said first area color conversion signal;
- means for generating a second area color conversion signal for color converting a second segment of said video picture according to said second area color conversion signal, said second segment, at least in part, overlapping at least a part of said first segment;
- a first mask generating means for generating a first electronic picture segment mask within which said first area color conversion signal is to be operative;
- a second mask generating means for generating a second electronic picture segment mask within which said second area color conversion signal is to be operative;
- means for coupling respective area color conversion signal generating means and said first and second mask generating means to produce respective first and second area color conversion signals present only within the boundries of the respective electronic picture segment mask;

summing means for summing the masked first and second area color conversion signals to produce a composite color conversion signal;

means for color modifying said video picture according to said composite color conversion signal; and priority generating means coupled between said first and second mask generating means and said combining means for setting a degree of priority of one of said first and second area color conversion signals over the other of said area color conversion signals in the area of said video picture in which said overlapping occurs.

36. A method of priority color modifying a specified area of a video picture, comprising:

generating a first area color conversion signal for color converting a first segment of said video picture according to said first area color conversion signal;

generating a second area color conversion signal for color converting a second segment of said video picture according to said second area color conversion signal, said second segment, at least in part, overlapping at least a part of said first segment;

generating a first electronic picture segment mask within which said first area color conversion signal is to be operative;

generating a second electronic picture segment mask within which said second area color conversion signal is to be operative;

enabling respective first and second area color conversion signals only within the boundries of their respective electronic picture segment mask;

summing the masked first and second area color conversion signals to produce a composite color conversion signal;

setting a degree of priority of one of said first and second area color conversion signals over the other of said area color conversion signals in the area of said video picture in which said overlapping occurs; and color modifying said video picture according to said composite color conversion signal.

37. A method for priority enhancement modifying a specified area of a video picture, comprising the steps of:

generating a first area enhancement conversion signal for enhancing a first segment of said video picture according to said first area enhancement conversion signal;

generating a second area enhancement conversion signal for enhancing a second segment of said video picture according to said second area enhancement conversion signal, said second segment segment at least in part, overlapping at least a part of said first segment;

generating a first electronic picture segment mask defining said first segment and having a value M1 within the boundaries of said first mask and the value (0) outside the boundaries of said mask;

multiplying said first electronic picture segment mask by a factor (1);

generating a second electronic picture segment mask defining said second picture segment and having a value M2 within the boundaries of said second mask, and a value (0) outside the boundaries of said second mask;

multiplying said second electronic picture segment mask by the factor (1−M1);

summing the masked first and second area enhancement conversion signals to produce a composite enhancement conversion signal; and enhancement modifying said video picture according to said composite enhancement conversion signal;

wherein M1 and M2 have any value between 0 and 1.

38. The method as claimed in claim 37, including the steps of:

generating n additional area enhancement conversion signals for enhancing n segments of said video picture according to said n area enhancement conversion signals;

generating n additional electronic picture segment masks defining respective n picture segments and having a value Mn within the boundaries of said n mask and having a value (0) outside the boundaries of said n mask;

multiplying said n electronic picture segment mask by a factor $(1-M_{n-1}) \ldots (1-M1)$; and wherein said summing step includes summing said n area enhancement conversion signals along with said first and second area enhancement conversion signals, and wherein $M_{n-1}$ has any value between 0 and 1.

39. Apparatus for priority enhancement modifying a specified area of a video picture, comprising:

means for generating a first area enhancement conversion signal for enhancing a first segment of said video picture according to said first area enhancement conversion signal;

means for generating a second area enhancement conversion signal for enhancing a second segment of said video picture according to said second area enhancement conversion signal, said second segment at least in part, overlapping at least a part of said first segment;

means for generating a first electronic picture segment mask defining said first segment and having a value M1 within the boundaries of said first mask and the value (0) outside the boundaries of said mask;

means for multiplying said first electronic picture segment mask by a factor (1);

means for generating a second electronic picture segment mask defining said second picture segment and having a value M2 within the boundaries of said second mask, and a value (0) outside the boundaries of said second mask;

means for multiplying said second electronic picture segment mask by the factor (1−M1);

summing means for summing the masked first and second area enhancement conversion signals to produce a composite enhancement conversion signal; and means for enhancement modifying said video picture according to said composite enhancement conversion signal;

wherein M1 and M2 have any value between 0 and 1.

40. The apparatus as claimed in claim 39, including:

means for generating n additional area enhancement conversion signals for enhancing n segments of said video picture according to said n area enhancement conversion signals;

means for generating n additional electronic picture segment masks defining respective n picture segments and having a value Mn within the boundaries of said n mask and having a value (0) outside the boundaries of said n mask;

means for multiplying said n electronic picture segment mask by a factor $(1-M_{n-1})\ldots(1-M1)$; and wherein said summing means includes means for summing said n area enhancement conversion signals along with said first and second area enhancement conversion signals, and wherein $M_{n-1}$ has any value between 0 and 1.

* * * * *